United States Patent
Krause et al.

(10) Patent No.: US 9,332,692 B2
(45) Date of Patent: May 10, 2016

(54) VEHICLE NETWORK, DEVICE AND METHOD FOR THE COORDINATION THEREOF

(71) Applicant: CLAAS SELBSTFAHRENDE ERNTEMASCHINEN GMBH, Harsewinkel (DE)

(72) Inventors: Thilo Krause, Glinde (DE); Rene Middelberg, Osnabrueck (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 16 days.

(21) Appl. No.: 14/331,497

(22) Filed: Jul. 15, 2014

(65) Prior Publication Data
US 2015/0025754 A1 Jan. 22, 2015

(30) Foreign Application Priority Data
Jul. 19, 2013 (DE) .......................... 10 2013 012 026

(51) Int. Cl.
*G06F 19/00* (2011.01)
*A01D 57/00* (2006.01)
*G05D 1/02* (2006.01)
*A01D 43/07* (2006.01)

(52) U.S. Cl.
CPC ................ *A01D 57/00* (2013.01); *A01D 43/07* (2013.01); *G05D 1/0287* (2013.01)

(58) Field of Classification Search
CPC ... A01B 79/005; A01D 57/00; A01D 43/073; G05D 2201/0201; G06Q 50/02
USPC ...................... 701/49, 50; 172/4.5, 9; 414/808
See application file for complete search history.

(56) References Cited

U.S. PATENT DOCUMENTS

| | | | |
|---|---|---|---|
| 5,749,783 A * | 5/1998 | Pollklas | 460/119 |
| 6,732,024 B2 * | 5/2004 | Wilhelm Rekow et al. | 701/26 |
| 2009/0044505 A1 | 2/2009 | Huster et al. | |
| 2010/0070145 A1 * | 3/2010 | Foster et al. | 701/50 |
| 2010/0332051 A1 * | 12/2010 | Kormann | 701/2 |

FOREIGN PATENT DOCUMENTS

EP 2020174 2/2009

* cited by examiner

*Primary Examiner* — Gertrude Arthur Jeanglaud
(74) *Attorney, Agent, or Firm* — Michael J. Striker

(57) ABSTRACT

A device for coordinating a first vehicle with a transfer device and a second vehicle with a loading chamber that is filled by the transfer device includes a monitoring device for monitoring the transfer from the first vehicle to the second vehicle and a control unit. The control unit relies on the monitoring device to detect a position of an impact point of a load crop stream discharged from a transfer device of the first vehicle to the second vehicle and, in the event the detected position deviates from a target position, the control device sets the ground-speed differential to be different from zero until the detected position matches the target position.

15 Claims, 2 Drawing Sheets

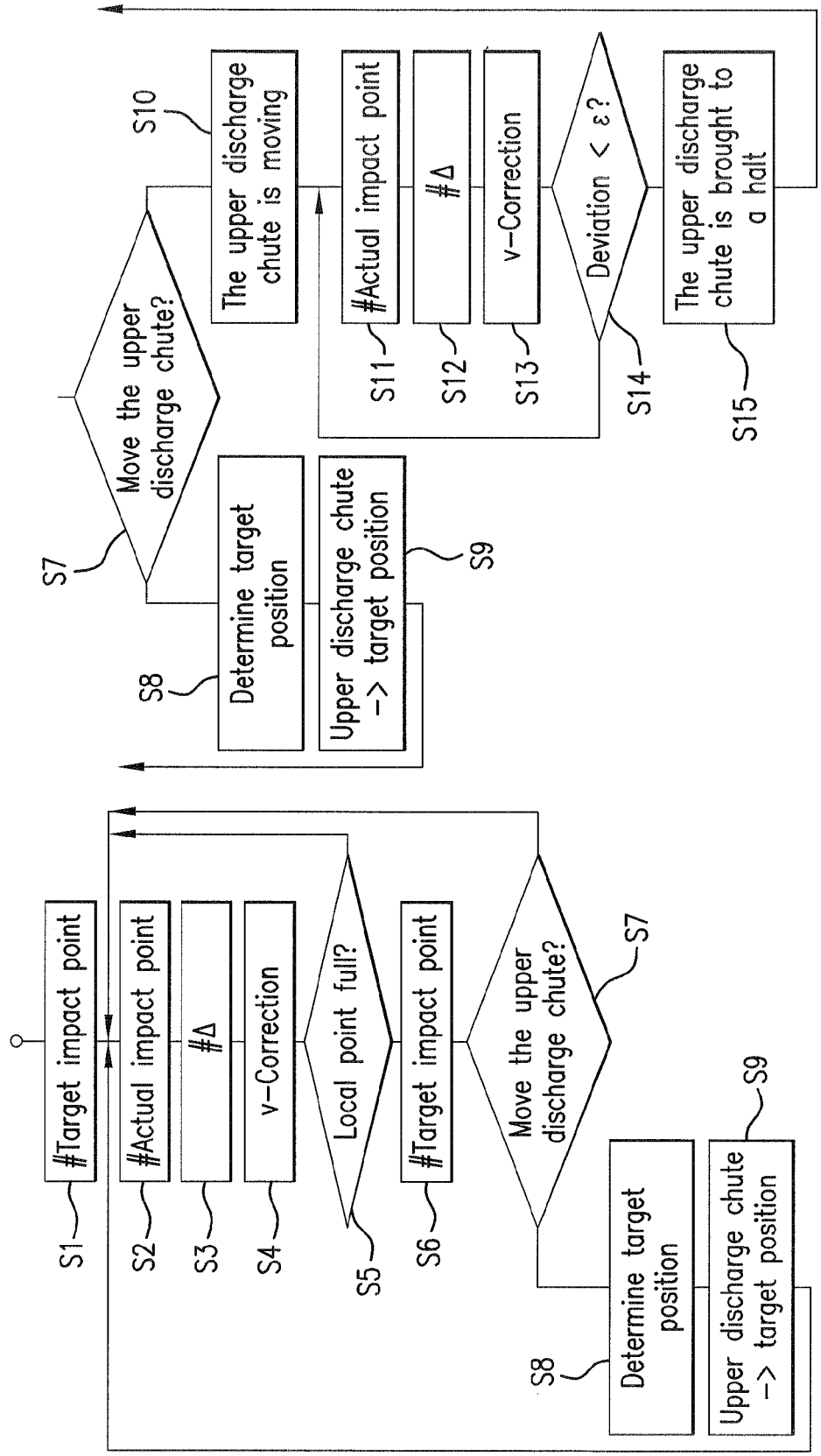

VEHICLE NETWORK, DEVICE AND METHOD FOR THE COORDINATION THEREOF

CROSS-REFERENCE TO A RELATED APPLICATION

The invention described and claimed hereinbelow is also described in German Priority Document DE 20 2013 012026.8, filed on Jul. 19, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a vehicle network of two vehicles working in a coordinated manner, such as a harvesting machine and a hauling vehicle that receives crop from the harvesting machine and a device and a method for the coordination thereof.

Harvesting machines in the form of forage harvesters are typically not designed to store notable quantities of crop on board. Instead, the crop to be chopped is continuously transferred to a hauling vehicle traveling adjacent thereto. Although harvesting machines in the form of combine harvesters usually comprise installed crop storage devices and therefore do not need to be continuously accompanied by a hauling vehicle during a harvesting operation, it is desirable in this case as well to be able to transfer the contents of the crop storage device to a hauling vehicle during travel, in order to avoid interrupting the harvesting procedure for the time required for the transfer.

In both cases, the position of the two vehicles relative to one another must be controlled exactly during the transfer procedure in order to ensure that all the transferred crop reaches a loading chamber of the hauling vehicle. Also, it should be possible to vary this position in a controlled manner such that the crop is distributed uniformly in the loading chamber, thereby ensuring good utilization of the capacity of the hauling vehicle.

A device known from EP 2 020 174 B1 for coordinating two vehicles uses a camera in order to identify, in images of the loading chamber, reference points for the positioning of the vehicles relative to one another, namely the edges of a loading chamber, and to detect the height profile of the crop in the loading chamber. On the basis of this height profile, a decision is made whether the position of the two vehicles relative to one another should be changed.

In order to change the impact point of the transferred crop in the hauling vehicle, it is possible with the conventional device to change the position of the transfer device on the harvesting machine. The transfer device is an upper discharge chute, which can swivel about two axes and comprises a swivellable flap mounted on the end thereof. Although it is possible to calculate a position of the transfer device, in the various degrees of freedom thereof, that is required for a desired displacement of the impact point and to control actuators accordingly, deviations occur nevertheless between a desired displacement and an actual displacement due, inter alia, to play in the bearings of the upper discharge chute and play between the upper discharge chute and the actuators driving this upper discharge chute.

Another way to change the impact point is to temporarily drive the two vehicles at different ground speeds. This results in the problem, however, that the vehicles need time to make adjustments in ground speed to adapt to a change in the target ground speed, thereby making it difficult to predict the movement of the vehicles relative to one another and to predict a resultant displacement of the impact point of the crop on the second vehicle during a change in ground speed. In addition, it is difficult to exactly predict and adjust the change in drive power required for a desired change in ground speed. Although it is possible, in a closed control loop, to measure a change in ground speed resulting from a change in drive power and to subsequently correct the drive power if necessary, this requires a considerable amount of time. Therefore, it is difficult to control a rapid and simultaneously accurate displacement of the impact point by means of a change in the vehicle ground speed.

SUMMARY OF THE INVENTION

The present invention overcomes the shortcomings of known arts, such as those mentioned above.

To that end, the present invention provides a device and a method for rapidly and accurately controlling a displacement of the impact point.

In one embodiment, the invention provides a device for coordinating two vehicles comprising a monitoring device for monitoring the transfer from the first vehicle to the second vehicle and a control device. The control device controls a ground-speed differential between the two vehicles, detects, using the monitoring device, a position of an impact point of a load crop stream discharged from a transfer device of the first vehicle to the second vehicle and, in the event the detected position deviates from a target position. The control device adjusts the ground-speed differential to be different from zero until the detected position matches the target position. That is, if the control device detects a deviation between the detected and target impact point, which is movable on the second vehicle, the impact point becomes the subject matter of the monitoring and is corrected, if necessary, by changing ground speed.

The control unit is preferably designed to control the ground-speed differential by changing the ground speed of the second vehicle. While this is underway, if the first vehicle moves at a constant ground speed through the crop stand, the crop throughput in the first vehicle does not change. The parameters of the processing of the crop in the first vehicle can therefore be held constant, and fluctuations in the quality of the transferred crop can be prevented.

The device preferably comprises at least one actuator for moving the transfer device relative to a reference point on the first vehicle. Since substantially less mass needs to be accelerated or slowed down in order to adjust the transfer device than is the case in order to change the ground speed of a vehicle, this adjustment is implemented in a short period of time, even across a greater distance. The impact point is rapidly shifted from one point at which there is risk of overfilling to the vicinity of a point where filling is still possible. This inventive operation eliminates the risk, at the moment, of locally overfilling the loading chamber despite a potential inaccuracy in the adjustment of the transfer device. More time is therefore available for correcting the inaccuracy and, since this correction is implemented by the vehicle ground speed, the transfer device is prevented from oscillating, which would occur if the movement thereof could not be sufficiently controlled.

The control unit should is set up to calculate, between a redetermination of the target position and the detection of the position of the impact point, an adjustment of the actuator required to displace the impact point to the target position and to control the calculated adjustment. By adjustment of the transfer device, it is possible to implement a majority of the desired displacement of the impact point in a brief period of time and so, if the position of the impact point is detected, the deviation from the target position needed to be eliminated by controlling the ground-speed differential is still minimal and is eliminated in a short period of time.

Depending on the dimensions of the transfer device and the loading surface, it is possible that a desired displacement of the impact point cannot be implemented simply by adjusting the actuator. In order to implement the desired displacement in a brief period of time in such a case, it is advantageous to reduce the distance between the desired impact point and the actual impact point by controlling the ground-speed differential. In this case, the ground speed control may be the only way to achieve the desired displacement, or this can take place simultaneously with an adjustment of the actuator. In order to rapidly implement the adjustment it is essential in this case to not adjust the transfer device first and then for the deviation between the desired displacement and the actual displacement, which is unavoidable due to the insufficient range of the transfer device, to induce a change in ground speed.

The control device is connected to a sensor system for detecting the distribution of the load crop and determines, by itself, the desired displacement of the impact point on the basis of the distribution of the load crop that is detected.

The sensor system comprises force sensors or fill level sensors distributed over the loading surface of the second vehicle. A camera also may be used as for this purpose, preferably the same camera that is used to detect the impact point.

Advantageously, the camera is mounted on the transfer device. Given that the camera moves along with the transfer device, the position of the impact point in the images delivered by the camera change very little when the transfer device is displaced, thereby simplifying the automatic detection of the impact point in the images. By contrast, reference points on the loading surface move to an extreme extent in the images delivered by the camera when the transfer device is moved. Unlike the impact point, these reference points are configured in terms of color or shape to automatically identify in the images.

In an embodiment, the invention provides a vehicle network comprising a first vehicle, which has the transfer device which is movable relative to a reference point on the first vehicle, a second vehicle, which has a loading chamber which is filled by the transfer device and a device for coordinating these vehicles in the above-described manner.

The control device is preferably located on board the first vehicle. This results in a cost-effective implementation of the invention, since only one such control unit is required, even if the first vehicle must be coordinated with second vehicles that do not remain the same.

The transfer device feeds the stream of crop directly into the loading, chamber of the second vehicle. If large track separations between the first and second vehicles must be maintained, however, it is advantageous to replace a long transfer device on the first vehicle that bridges the entire track separation between the vehicles with a combination of a shorter transfer device with a transfer-aid device of the second vehicle. The transfer-aid device receives a load crop stream from the transfer device of the first vehicle and further conveys this load crop stream to the loading chamber.

Such a transfer-aid device on the second vehicle is movable to uniformly distribute the load crop in the loading chamber. In this case, the receiving end of the transfer-aid device is the impact point, which must be reliably impacted by the load crop stream even when the transfer-aid device on the second vehicle is moved.

In order to simplify the coordination of the movements of the transfer device and the transfer-aid device, a drive of the transfer-aid device is preferably controlled by the same control device as the actuator of the transfer device.

The invention also includes a method for coordinating the transfer from a first vehicle to a second vehicle, having the steps of c) detecting the position of an impact point of a load crop stream on the second vehicle, wherein this load crop stream is discharged by a transfer device of the first vehicle;

d) comparing the detected position with a target position e) in the event that the detected position deviates from the target position, a ground-speed differential between the vehicles is set to a value that differs from zero until the detected position matches the target position.

In order to minimize the time required to bring the detected position in agreement with the target position, it is advantageous to implement a step b) in advance, namely that of calculating an adjustment of an actuator (11, 12) required to shift the impact point to the target position and controlling the adjustment.

The target position is preferably determined in advance in a step a) on the basis of the distribution of the load crop in a loading chamber of the second vehicle.

BRIEF DESCRIPTION OF THE DRAWINGS

Further features and advantages of the invention will become apparent from the description of exemplary embodiments that follows, with reference to the attached figures, wherein:

FIG. 4 shows a flow chart of a working procedure implemented by the control unit of the coordination device;

FIG. 5 shows a flow chart of a variant of the working procedure; and

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
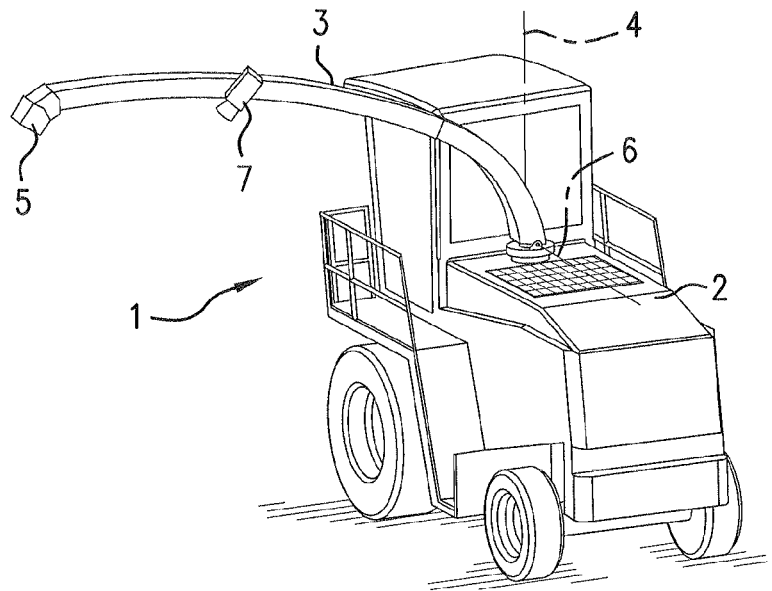
FIG. 1 shows a view of a forage harvester, as the first vehicle of a vehicle network according to the invention.

FIG. 1 shows a forage harvester 1 as an example of a vehicle used as the first vehicle within the scope of a vehicle network according to the invention. A front harvesting attachment is mounted on a front side of the forage harvester 1 (not shown), which faces away from the observer. A machine housing 2 of the forage harvester 1 contains a chopping assembly for chopping crop that is picked up by the front harvesting attachment, and a blower, which accelerates the chopped crop into an upper discharge chute 3. The upper discharge chute 3 rotates about a vertical axis 4, whereby an outlet flap 5 on the free end of the upper discharge chute 3 moves on a circular trajectory. In order to permit the crop stream to move in a second degree of freedom, namely radially with respect to the axis 4, the upper discharge chute 3 is further swivelled about a horizontal axis 6, where the outlet flap 5 is swivelled in order to redirect the stream of the crop.

A camera 7 is mounted on the upper discharge chute 3, adjacent to the outlet flap 5. As an alternative, the camera may be mounted independently of the upper discharge chute 3, e.g., on a mast mounted on a machine housing 2 or the driver's cab.

Figure 2:
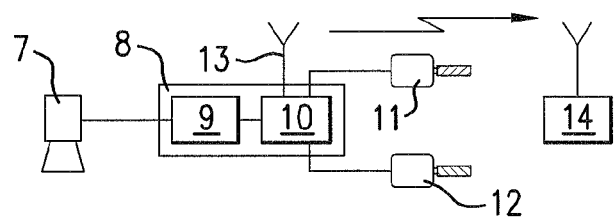
FIG. 2 shows a block diagram of a coordination device according to the invention.

The camera 7 is part of the coordination device depicted in the block diagram of FIG. 2. A microcomputer 8 of the coordination device comprises an image-processing unit 9, which is programmed to extract various bits of information from images delivered by the camera 7. The control unit 10 controls actuators 11, 12 on the basis of the information delivered by the image-processing unit 9. The actuators adjust the upper discharge chute 3 in at least one degree of freedom and preferably in the above-described two degrees of freedom. The control unit 10 controls a downstream control unit 14 of a hauling vehicle via a wireless interface 13 in order to guide this hauling vehicle on a course with a specified offset relative to the forage harvester 1 that allows the crop to be transferred to the hauling vehicle.

Figure 3:
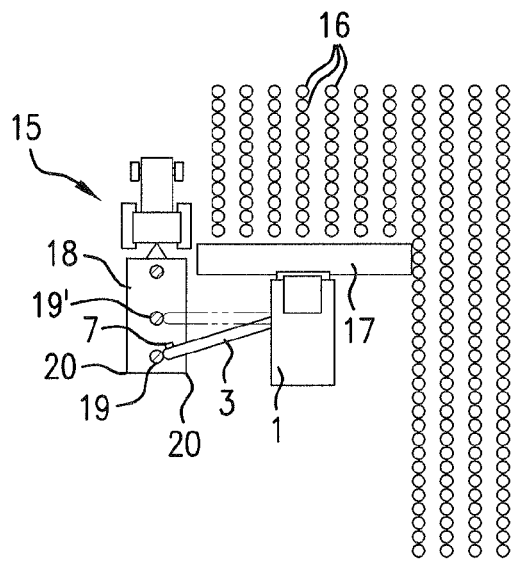
FIG. 3 shows a vehicle network equipped with the coordination device, at work on a field.

FIG. 3 shows, in a schematic top view, the forage harvester 1 and the hauling vehicle 15, e.g., a tractor comprising a trailer at work on a field to harvest a stand of plants 16. The width of a front harvesting attachment 17 mounted on the forage harvester 1 is dimensioned such that the upper discharge chute 3 of the forage harvester 1 reaches the loading chamber 18 of the hauling vehicle 15 and fill this loading chamber from above. In the position of the upper discharge chute 3 indicated with solid lines, the stream of chopped crop lands in the loading chamber 18 at an impact point 19 in the vicinity of the rear. The camera 7 monitors the transfer process and delivers images to the image-processing unit 9 that show the impact point 19 and reference points 20 on the hauling vehicle 15, such as corners of the loading chamber 18.

On the basis of the information extracted from these images by the image-processing unit 9, the control unit 10 is capable of checking coordinates of the reference points 20 (and therefore also checking the correct positioning of the hauling vehicle 15 relative to the forage harvester 1) in a coordinate system based on the forage harvester 1, estimating the coordinates of the impact point 19 relative to the reference points 20 and the fill level of the crop in the vicinity of the impact point 19. If necessary based thereon, the control unit 10 influences the course and/or ground speed of one of the two vehicles 1, 15, preferably the hauling vehicle 15, in order to restore a desired relative position.

Once a predefined fill level of the crop has been reached at the impact point 19, the control unit 10 either shifts the impact point of the crop stream to a point 19', as indicated in FIG. 3 by a dashed outline, by moving the upper discharge chute 3 relative to the machine housing 2 of the forage harvester 1, in particular via rotation about the axis 4, or by temporarily varying the ground speed of one of the two vehicles 1, 15.

A flow chart of a method implemented by such a control is depicted in FIG. 4. A transfer procedure begins in step S1 by the control unit 10 defining a target impact point for the crop stream in the loading chamber 18, e.g., the impact point 19 depicted in FIG. 3. In step S2, the image-processing unit 9 determines the coordinates of the actual impact point of the crop stream relative to the reference points 20 by reference to images from the camera 7. In step S3, the control unit 10 calculates the distance Δ between the target impact point and the actual impact point. This distance Δ is used in step S4 as the deviation-from-target signal of a ground-speed control loop, which continuously compares the ground speed of the hauling vehicle 15 with that of the forage harvester 1.

Steps S2 to S4 are implemented in an endless loop provided a predefined target fill level at the impact point 19 has not been reached. If the target fill level has been reached, the method branches to step S6, in which a new target impact point, e.g., the impact point 19', is defined. On the basis of the distance between the old target impact point and the new target impact point and the position and dimensions of the upper discharge chute 3, the control unit 10 decides whether the new target impact point can be reached or not by moving the upper discharge chute 3 without changing the separation between the vehicles 1, 15. If the new target impact point cannot be reached by moving the upper discharge chute, the method immediately returns directly to step S2, whereupon the distance Δ between the new target impact point and the actual impact point is input into the ground-speed control in step S4 as the deviation from target. As a result, the vehicle 15 is accelerated or slowed down until the crop stream impacts the new impact point without the position of the upper discharge chute 3 on the forage harvester 1 having been changed.

The ground-speed control loop must have a relatively high time constant in order to ensure that a sudden change of the error does not result in excessive changes in ground speed and, therefore, in the position of the hauling vehicle 15 oscillating relative to the forage harvester 1. The change to the impact point therefore lasts for a similarly long time in this manner.

If it is determined, however, that the new impact point 19' is within the range of the upper discharge chute 3, the control unit 10 initially calculates, in step S8, a target position of the upper discharge chute 3 which would allow the crop stream discharged by this upper discharge chute to impact the new impact point 19', while disregarding disturbing influences such as, in particular, an inherent inaccuracy of the actuators 11, 12 or play between the actuators 11, 12 and the upper discharge chute 3. In step S9, the upper discharge chute is then moved into the thusly calculated target position. The method now returns to step S2 in order to detect the actual impact point and calculate the deviation Δ (S3). This deviation Δ is then corrected by precisely adjusting the ground speed in the endless loop of steps S2 to S4. Since the deviation Δ is never too great, given that the upper discharge chute 2 was adjusted previously, extreme corrections of the ground speed are not required and a stationary state in which the crop stream impacts the impact point 19' in a stationary manner is quickly achieved.

A variant of the method is represented in FIG. 5. Steps S1 to S9 of this method are identical to those of FIG. 4, and so these will not be explained once more and steps S1 to S6 are not shown in FIG. 5. Once a new target impact point (S6) has been defined, if it is determined in step S7 that the new target impact point cannot be reached simply by moving the upper discharge chute 3, the control unit 10 starts the upper discharge chute 3 moving, with the aid of the actuators 11, 12, in the direction of the new target position in step S10. While the upper discharge chute 3 moves, the changing actual impact point is detected (S11) with the aid of the camera 7 as in step S2, and the deviation Δ between the target impact point and the actual impact point is calculated (S12) and is input into the ground-speed control loop as the deviation from target. If it is determined in S14 that the deviation from target is still greater than a limit value e, steps S11 to S13 are repeated, otherwise the upper discharge chute 3 is halted in step S15. Since the ground-speed correction and the movement of the upper discharge chute 3 take place simultaneously, the deviation Δ decreases more rapidly than in the method according to FIG. 4, and therefore a stationary state is reached more quickly.

A further advantage of the method is that, if an impact point close to one end of the loading chamber, such as the impact point 19, was approached using this method, the freedom of motion of the upper discharge chute 3 toward the center of the loading chamber is greater than in the opposite direction, i.e., the upper discharge chute 3 is generally positioned such that a large part of the loading chamber 18 can be reached simply by moving the upper discharge chute 3 without the need to move the vehicles 1, 15 relative to one another.

Figure 6:
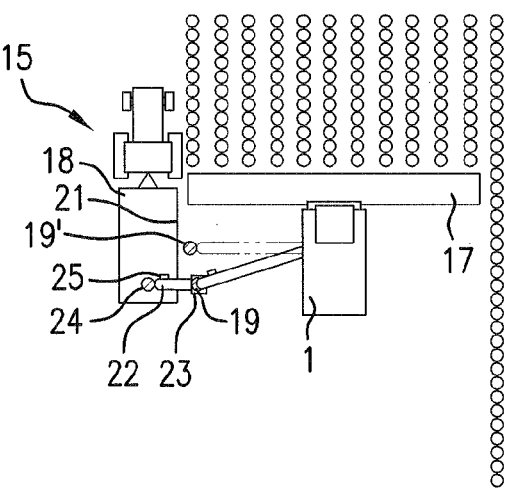
FIG. 6 shows a vehicle network according to the invention.

FIG. 6 shows an embodiment of a network of vehicles 1, 15, according to the present invention. In this embodiment, the forage harvester 1 carries a front harvesting attachment 17, which is so wide that the upper discharge chute 3 does not extend laterally beyond the end of the front harvesting attachment 17. In order to ensure that the hauling vehicle 15 can be loaded nevertheless, an auxiliary device such as a conveyor belt 22 is mounted in a displaceable manner on a longitudinal wall 21 of the loading chamber 18. The impact point 19, which is monitored in the method according to FIG. 4 or 5, for the crop stream discharged by the upper discharge chute 3 is a collection funnel 23 of the conveyor belt 22 in this case. In addition to the collection funnel 23, the camera 7 also optionally monitors a point 24 in the loading chamber 18 onto which the conveyor belt 22 discharges the crop stream. Alternatively, it further is possible to use a camera 25 for this purpose that is mounted on the structure that includes conveyor belt 22, which camera therefore moves along with the conveyor belt 22 along the longitudinal wall 21 as the conveyor belt (structure) moves.

Once the target fill level has been reached at the point 24 and the loading chamber 18 must be filled at another point, the control unit 10 defines a new target impact point 19' in this case as well. Regardless of whether the new impact point 19' can be reached simply by moving the upper discharge chute 3 or whether the position of the vehicles 1, 15 relative to one another must be changed, the control unit 10 controls the displacement of the conveyor belt 22 along the wall 21 in order to ensure that the crop stream always impacts the collection funnel 23 of this conveyor belt.

REFERENCE CHARACTERS 1. forage harvester
2. machine housing
3. upper discharge chute
4. axis
5. outlet
6. axis
7. camera
8. computer
9. image-processing unit
10. control unit
11. actuator
12. actuator
13. wireless interface
14. control unit positioned in hauling vehicle
15. hauling vehicle comprising a tractor and trailer
16. plant
17. front harvesting attachment
18. loading chamber
19. impact point
20. reference point
21. longitudinal wall
22. conveyor belt
23. collection funnel
24. point
25. camera As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A device for coordinating a first vehicle, comprising an upper discharge chute, and a second vehicle, comprising:
   a monitoring device for monitoring a transfer from the first vehicle to the second vehicle; and
   a control unit for controlling a motion of the upper discharge chute, a ground-speed differential between the first vehicle and the second vehicle and for detecting a position of an impact point of a load crop stream on the second vehicle that is being discharged by a transfer device of the first vehicle;
   wherein if a new target position of the impact point is defined by the control unit and in the range of the upper discharge chute, the control unit moves the upper discharge chute into a calculated target position of the upper discharge chute,
   wherein if, after the upper discharge chute has been moved into the calculated target position of the upper discharge chute, the detected position of the impact point deviates from a target position, the control unit sets a ground-speed differential to differ from zero until the detected position of the impact point on the second vehicle matches a target position of the impact point on the second vehicle.

2. The device according to claim 1, wherein control unit controls the ground-speed differential by changing a ground speed of the second vehicle.

3. The device according to claim 1, further comprising at least one actuator for moving the transfer device relative to a reference point of the first vehicle.

4. The device according to claim 3, wherein the control unit calculates, between a redetermination of the target position on the second vehicle and the detection of the position of the impact point on the second vehicle, an adjustment of the actuator required to displace the impact point to the target position and to control the calculated adjustment.

5. The device according to claim 4, wherein the control unit checks whether the predetermined target position is obtainable by adjusting the transfer device and, if not, then, between the redetermination of the target position and the detection of the position of the impact point, the control unit reduces a separation between the target position and an actual position of the impact point on the second vehicle by controlling the ground-speed differential.

6. The device according to claim 1, wherein the control unit is connected to a sensor system for detecting a load crop distribution and determines a new target position of the impact point based on the detected load crop distribution.

7. The device according to claim 6, wherein a sensor for detecting the impact point, the sensor system for detecting the load crop distribution or both is a camera.

8. The device according to claim 7, wherein the camera is mounted on the transfer device.

9. A vehicle network formed with a first vehicle having a transfer device, a second vehicle with a loading chamber that is filled by the transfer device and a device for coordinating a first vehicle and a second vehicle, the device for coordinating comprising:
- a monitoring device for monitoring a transfer from the first vehicle to the second vehicle; and
- a control unit for controlling a motion of the transfer device of the first vehicle, a ground-speed differential between the first vehicle and the second vehicle and detecting a position of an impact point of a load crop stream on the second vehicle that is being discharged by the transfer device of the first vehicle;
- wherein if a new target position of the impact point is defined by the control unit and in a range of the transfer device, the control unit moves the transfer device into a calculated target position of the transfer device;
- wherein if, after the transfer device has been moved into the calculated target position of the transfer device, the detected position of the impact point deviates from a target position of the impact point, the control unit sets a ground-speed differential to differ from zero until the detected position of the impact point on the second vehicle matches a target position of the impact point on the second vehicle.

10. The vehicle network according to claim 9, wherein the control unit is located on board the first vehicle.

11. The vehicle network according to claim 9, wherein the second vehicle comprises a transfer-aid device for receiving a load crop stream from the transfer device of the first vehicle and further conveying the load crop stream, and wherein a receiving end of the transfer-aid device is the impact point and has a drive for moving the transfer-aid device relative to the loading chamber of the second vehicle.

12. The vehicle network according to claim 11, wherein the transfer-aid device drive is controlled by the control unit.

13. A method for coordinating the transfer from a first vehicle configured with a transfer device to a second vehicle, comprising steps of:
- detecting a position of an impact point of a load crop stream on the second vehicle that is discharged by the transfer device of the first vehicle;
- comparing the detected position with a target position; and
- in the event that the detected position deviates from the target position, and the target position is in a range of the transfer device, moving the transfer device into the target position of the transfer device and thereafter, setting a ground-speed differential between the vehicles to a value that differs from zero until the detected position matches the target position.

14. The method according to claim 13, further comprising a step of calculating a displacement of an actuator required to displace the impact point to the target position and controlling the displacement.

15. The method according to claim 14, further having a step of determining the target position on the basis of the distribution of the load crop in a loading chamber of the second vehicle.

* * * * *